United States Patent
Kurosawa et al.

(10) Patent No.: US 6,629,925 B2
(45) Date of Patent: Oct. 7, 2003

(54) LIGHT SOURCE DEVICE FOR ENDOSCOPE

(75) Inventors: Hidehito Kurosawa, Tokyo (JP); Akihiro Takahashi, Tokyo (JP)

(73) Assignee: Pentax Corporation, Tokyo (JP)

(*) Notice: Subject to any disclaimer, the term of this patent is extended or adjusted under 35 U.S.C. 154(b) by 0 days.

(21) Appl. No.: 09/866,591

(22) Filed: May 30, 2001

(65) Prior Publication Data

US 2001/0051763 A1 Dec. 13, 2001

(30) Foreign Application Priority Data

May 31, 2000 (JP) ..................... P2000-162102

(51) Int. Cl.[7] ................................ A61B 1/06
(52) U.S. Cl. ............... 600/180; 600/181; 600/178; 600/160
(58) Field of Search ............... 600/180, 160, 600/181, 178, 184, 248; 359/385, 230, 234, 236, 228

(56) References Cited

U.S. PATENT DOCUMENTS

| | | | | |
|---|---|---|---|---|
| 4,706,657 A | * | 11/1987 | Miyagi | 600/178 |
| 4,710,807 A | * | 12/1987 | Chikama | 348/371 |
| 4,862,258 A | * | 8/1989 | Kidawara et al. | 348/70 |
| 5,150,702 A | * | 9/1992 | Miyanaga et al. | 348/362 |
| 5,488,509 A | | 1/1996 | Takahashi et al. | |
| 6,086,531 A | * | 7/2000 | Tomioka et al. | 600/178 |
| 6,110,106 A | * | 8/2000 | MacKinnon et al. | 600/160 |
| 6,334,845 B1 | * | 1/2002 | Higuchi et al. | 348/68 |

FOREIGN PATENT DOCUMENTS

JP 7-327926 12/1995

* cited by examiner

*Primary Examiner*—Henry Bennett
*Assistant Examiner*—Kathryn Ferko
(74) *Attorney, Agent, or Firm*—Greenblum & Bernstein, P.L.C.

(57) ABSTRACT

A light source device comprises an aperture mechanism having a pair of aperture blades in an optical path formed between a light source and an incident end surface of a light guide on which an illuminating light is made incident. The first and second aperture blades are rotated, in a plane perpendicular to the optical axis of the optical path, about a movable shaft, which is parallel to the optical axis. The first and second aperture blades shade the luminous flux of the illuminating light, to adjust the amount of illuminating light, from the outer peripheries of the section of the luminous flux. A protruding plate is formed on an inside periphery of the first aperture blade. When the first aperture blade closes a half of the section, the protruding plate shades a swinging region above the center of the section of the luminous flux.

8 Claims, 6 Drawing Sheets

LIGHT SOURCE DEVICE FOR ENDOSCOPE

BACKGROUND OF THE INVENTION

1. Field of the Invention

The present invention relates to a light source device for an endoscope, and particularly to a light source device which has an aperture for adjusting the amount of illuminating light supplied from a light source to an incident end surface of a light guide provided in the endoscope.

2. Description of the Related Art

An endoscope has a flexible conduit to be inserted into the internal organs of a human body, and a light guide is provided in the flexible conduit to transmit illuminating light. A light source device is connected to an end portion of the light guide. The illuminating light radiated from the light source device is led to an incident end surface and passes through the light guide to reach the distal end of the light guide, so that the illuminating light is output from the end surface of the endoscope to illuminate the diseased part. In the case of a fiberscope, the light reflected from the illuminated portion is led to an eyepiece provided in an operation unit, and in the case of an electronic endoscope, the reflected light is converted to an electric signal by a CCD provided in an end portion of the endoscope, and an image is displayed by a monitor device. Thus, the illuminated portion can be observed through the eyepiece or the monitor device.

In the light source device for an endoscope described above, an aperture for adjusting the amount of light, and a condenser lens for condensing the light onto an incident end surface of the light guide, are provided between the light source and the incident end surface. The aperture mechanism has a pair of flat plates which are placed on a plane perpendicular to the optical axis and are symmetrically disposed with respect to the optical axis. The flat plates are rotated about a rotation axis, which is parallel to the optical axis, so that the luminous flux is shaded horizontally from the outside peripheries of the section of the luminous flux. Accordingly, the degree of opening of the aperture is adjusted, so that the amount of illuminating light, or the brightness of the illuminated portion, is adjusted.

Usually, a xenon lamp is utilized as the light source for illumination of the endoscope, since it provides a high luminance and a lesser amount of heat. However, because of a convection of the xenon gas enclosed in the lamp, or an oscillation phenomenon and so on occurring in the electric discharge, the light radiated by the xenon lamp contains a swinging of the amount of light in an area above the center of the luminous flux, and thus an illuminating light, in which the amount of light is uniform in the section of the luminous flux, cannot be obtained. When the aperture is almost fully open and the amount of light is relatively large, the swinging does not generate a substantial problem. Conversely, when the aperture is closed to reduce the amount of light, the swinging becomes remarkable, and this swinging may interfere with the observation of the illuminated portion through the eyepiece or the monitor device.

SUMMARY OF THE INVENTION

Therefore, an object of the present invention is to provide a light source device for an endoscope, which reduces an influence of the swinging of the amount of light even when the amount of light is reduced by the aperture mechanism, so that an illuminating light, in which the amount of light is uniform in the section of the luminous flux, can be obtained.

According to the present invention, there is provided a light source device for an endoscope, comprising a light source and an aperture mechanism.

The light source radiates an illuminating light to an incident end surface of a light guide of the endoscope. The aperture mechanism is disposed in an optical path formed between the light source and the incident end surface. The aperture mechanism has a pair of aperture blades, which are perpendicular to the optical axis of the illumination light and rotatable about a rotation axis which is parallel to and located above the optical axis, and a protruding portion integrally formed on an inside periphery of at least one of the aperture blades. The inside periphery faces the optical path. The aperture blades are rotated, so that the optical path is shaded horizontally from the outside peripheries thereof by the aperture blades. The aperture blades are further rotated, so that an upper area above the center of the optical path is shaded by the protruding portion.

Preferably, the inside periphery of each of the aperture blades is linearly formed, and the protruding portion is a triangle of which the base is on the inside periphery of one of the aperture blades and the vertex is the peak of the protruding portion. This structure enables a simple manufacturing process of the aperture blades.

Further, according to the present invention, there is provided a light source device for an endoscope, comprising a light source and a shading member.

The light source radiates illuminating light to an incident end surface of a light guide of the endoscope. The shading member is disposed in an optical path formed between the light source and the incident end surface. The shading member is movable so as to shade the optical path. The shading member has a protruding portion integrally formed on an inside periphery thereof facing the optical path. The shading member is moved, so that the optical path is shaded horizontally from the outside peripheries thereof by the shading member, and the shading member is further rotated so that an upper area above the center of the optical path is shaded by the protruding member.

The light source comprises a xenon lamp, for example. Preferably, the shading member comprises an aperture blade, and the protruding portion comprises a protruding plate flush with the aperture blade. In this structure, the inside periphery may be linearly formed, and the protruding plate may be a triangle of which the base is on the inside periphery and the vertex is the peak of the protruding plate. This enables a simple manufacturing process of the aperture blades. Preferably, the shading member is rotated about a rotation axis which is parallel to and located above the optical axis of the illumination light.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention will be described below with reference to the embodiments shown in the drawings.

Figure 1:
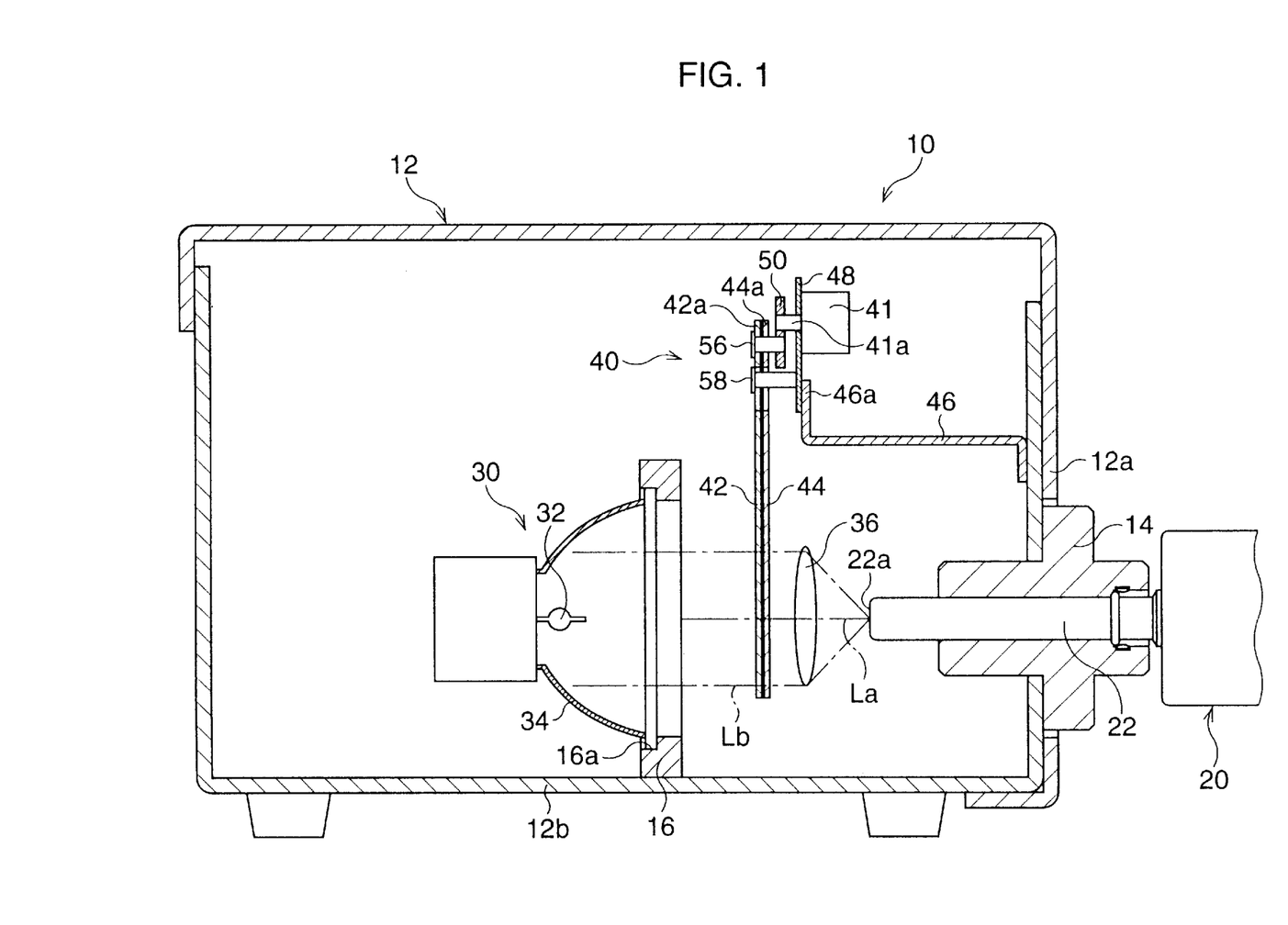
FIG. 1 is a sectional view schematically showing a main structure of a light source device for an endoscope, to which an embodiment of the present invention is applied.

FIG. 1 is a sectional view schematically showing a main structure of a light source device 10 for an endoscope. The light source device 10 has a box-shaped housing 12, and an attaching member 14 is fixed to a side wall 12a of the housing 12. A light guide 22 is projected from an end portion of an endoscope 20, and is detachably attached to the attaching member 14. A light source support member 16 is rigidly fixed to a center portion of a bottom plate 12b of the housing 12, and is extended perpendicularly thereto. An opening 16a, the central axis of which extends horizontally, is formed in the light source support member 16, and a light source is fixed in the opening 16a. As shown in FIG. 1, in a state in which the light guide 22 is inserted into the attaching member 14, a light source 30 faces an incident end surface 22a of the light guide 22 with a predetermined distance therebetween.

The light source 30 is a xenon lamp having an electric-discharge tube 32 in which xenon gas is enclosed. In the electric-discharge tube 32, a short-arc electric-discharge occurs between two electrodes, so that a plasma is generated to produce a high intensity light. A semi-sphere-shaped reflection mirror 34 is provided around the electric-discharge tube 32, so that light generated by the electric-discharge is radiated as a parallel luminous flux directed to the incident end surface 22a. In FIG. 1, the optical axis of the luminous flux from the light source 30 to the incident end surface 22a is indicated by a chain line La and the outer periphery of the luminous flux is indicated by a chain line Lb.

An aperture mechanism 40 and a condenser lens 36 are disposed in an optical path formed between the light source 30 and the incident end surface 22a. The amount of the illuminating light, radiated as the parallel luminous flux, is adjusted by the aperture mechanism 40, and the illuminating light is then condensed onto the incident end surface 22a by the condenser lens 36.

The aperture mechanism 40 is supported by an aperture support plate 46 fixed on an inner surface of the side wall 12a of the housing 12, and has first and second aperture blades 42 and 44 each of which is an opaque thin flat plate, rotated in a plane perpendicular to the optical axis La by a motor 41. A radiating operation of the light source 30 and a rotating operation of the motor 41 are controlled by a control circuit not shown. Electric power is supplied to the light source 30 and the motor 41 from an electric power circuit not shown.

Figure 2:
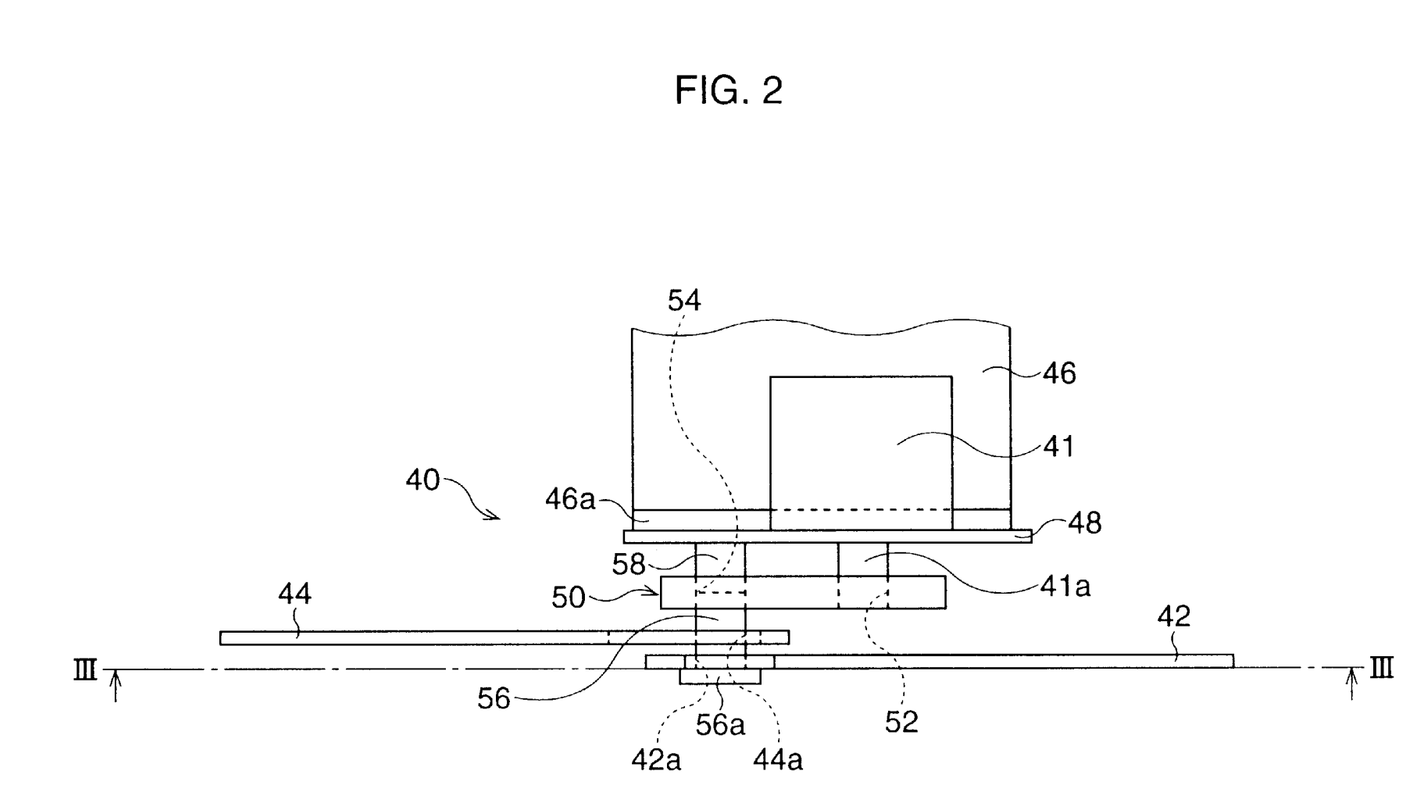
FIG. 2 is a plan view of the aperture mechanism viewed from a vertical upper side.
Figure 3:
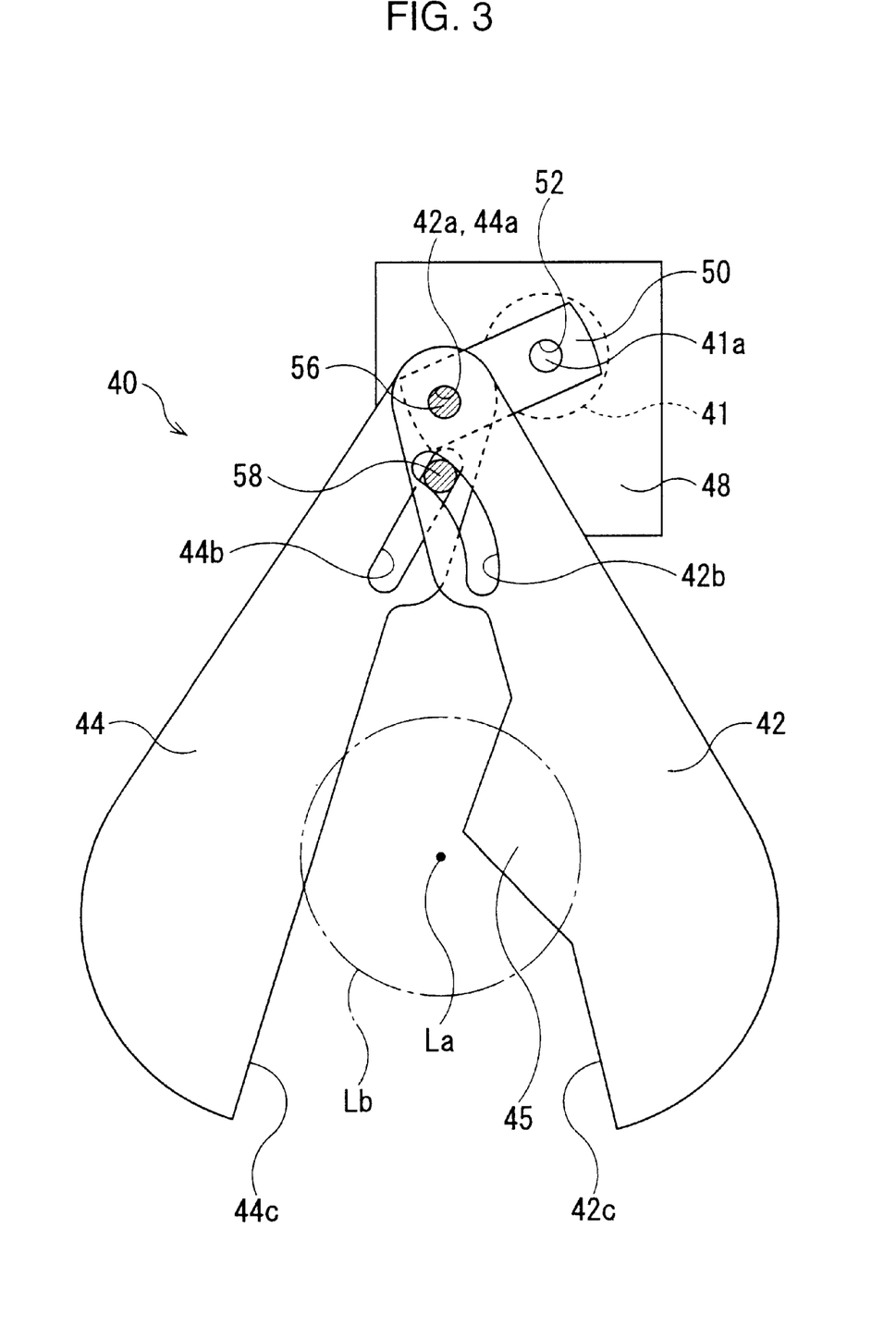
FIG. 3 is a view of the light guide viewed from III—III line of FIG. 2.

With reference to FIGS. 1, 2 and 3, the construction of the aperture mechanism 40 is described in detail below. FIG. 2 is a plan view of the aperture mechanism 40 viewed from a vertical upper side. FIG. 3 is a view of the aperture mechanism 40 viewed from III—III line of FIG. 2 to the light guide 22. Note that the aperture support plate 46 is omitted in FIG. 3.

A light source side end portion 46a of the aperture support plate 46 is extended upward, and an attaching plate 48 is fixed to and in parallel with the light source side end portion 46a. The motor 41 is fixed on the attaching plate 48, and a rotational shaft 41a of the motor 41 penetrates the attaching plate 48 and projects to the light source 30. An arm member 50 has a first engaging hole 52 at the end portion thereof, and a rotational shaft 41a of the motor 41 is fitted and fixed in the first engaging hole 52. Thus, the arm member 50 is rotatable about the rotational shaft 41a of the motor 41. A second engaging hole 54 is formed in the other end of the arm member 50, and an end of a movable shaft 56 is fitted in the second engaging hole 54. The movable shaft 56 extends from the arm member 50 to the opposite side of the motor 41, i.e., toward the light source 30.

The movable shaft 56 penetrates shaft holes 42a and 44a formed in upper end portions of the first and second aperture blades 42 and 44, and a head portion 56a of the movable shaft 56 is projected from the shaft holes 42a and 44a. Thus, the aperture blades 42 and 44 are rotatable about the movable shaft 56, which is parallel to and located above the optical axis La. The first and second aperture blades 42 and 44 are perpendicular to the rotation axis of the movable shaft 56 and the optical axis La, and are placed in parallel with a predetermined gap therebetween along the optical axis La, so that any interference between the first and second aperture blades 42 and 44 is prevented.

Referring to FIG. 3, the first aperture blade 42 is formed in such a manner that the breadth becomes larger from the upper end, in which the shaft hole 42a is formed, to the lower end, which is located at the lower right in the drawing. The first aperture blade 42 is fan-shaped for approximately 20 degrees about the shaft hole 42a. An arc guide slot 42b is formed in a portion under the shaft hole 42a in the drawing, and a fixed shaft 58, which is rigidly fixed to the attaching plate 48 and extends to the light source 30, is loosely fitted in the guide slot 42b. An inside periphery 42c of the first aperture blade 42, which faces the optical axis La, is linearly formed, and a protruding plate 45, which protrudes toward the optical axis La, is formed at approximately the center of the inside periphery 42c. The protruding plate 45 is a triangle of which the base is on the inside periphery 42c and the vertex is the peak of the protruding plate 45. Namely, the protruding plate 45 is flush with the first aperture plate 42, and is integrally formed on the inside periphery 42c.

The contour and the size of the second aperture blade 44 are the same as those of the first aperture blade 42 except for the protruding plate 45. Namely, a protruding plate is not formed on an inside periphery 44c of the second aperture blade 44. The second aperture blade 44 is symmetrical with the first aperture blade 42 with respect to a straight line vertically extending through the optical axis La. A linear guide slot 44b is formed in a portion under the shaft hole 44a, and the fixed shaft 58 is loosely fitted in the guide slot 44b.

The first and second aperture blades 42 and 44 are supported by the movable shaft 56 at one end portions thereof while being guided by the fixed shaft 58. Therefore, when the arm member 50 is rotated by the motor 41, the first and second aperture blades 42 and 44 are rotated toward the optical axis La or away from the optical axis La. Accordingly, the whole or a part of the luminous flux passes a fan-shaped space formed between the inside peripheries 42c and 44c of the first and second aperture blades 42 and 44, and is led to the condenser lens 36.

Thus, the first and second aperture blades 42 and 44 serve to provide an aperture that adjusts the amount of light in accordance with the degree of opening of the angle of the inside peripheries 42c and 44c.

FIGS. 4 through 9 show relative positional relationships between each of the members 41, 42, 44, 56 and 58 of the aperture mechanism 40 and a section of the optical path, from the fully open condition to the fully closed condition of the aperture, step by step. A circular region S1 enclosed by a broken line is a section of luminous flux close to the first and second aperture blades 42 and 44, and a light passing region S2, in which hatching from bottom-left to top-right is indicated, is a sectional area of the luminous flux which is shaded by the aperture blades 42 and 44.

Figure 4:
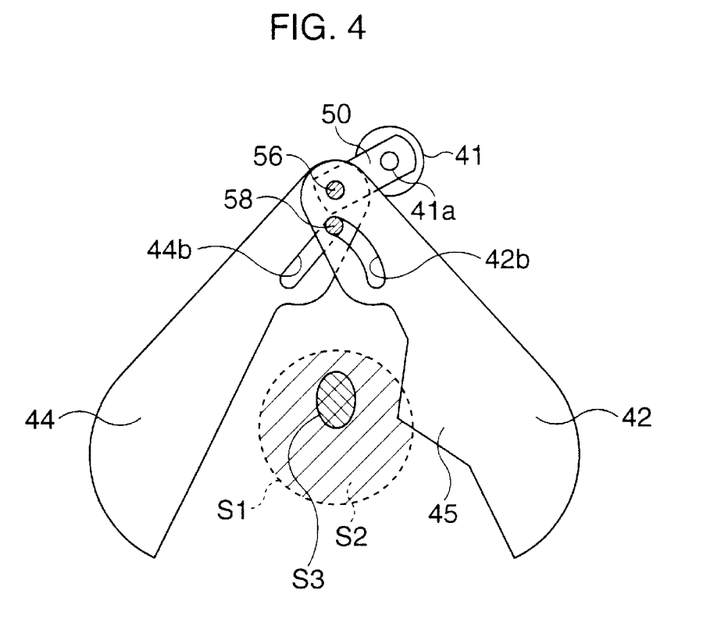
FIG. 4 is a view showing a relative positional relationship between each member of the aperture mechanism and a section of the optical path in the fully open condition.
Figure 5:
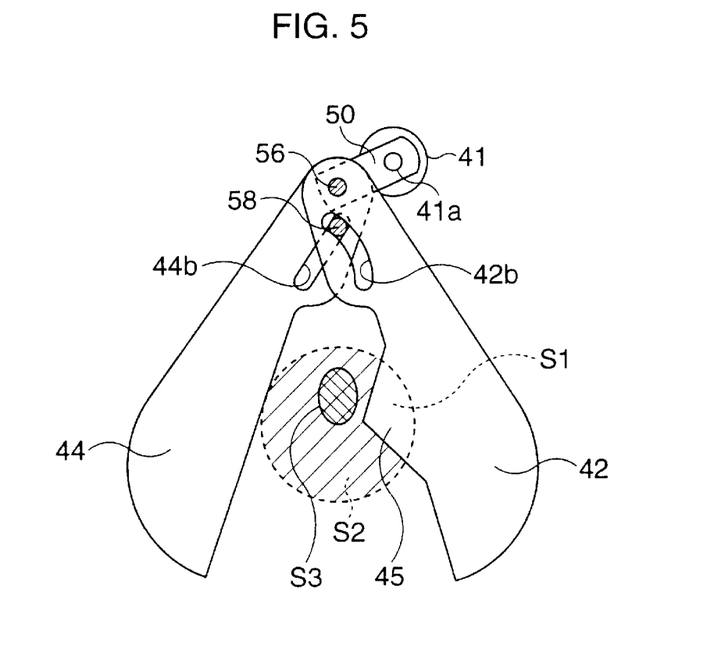
FIG. 5 is a view showing a relative positional relationship between each member of the aperture mechanism and the section of the optical path when the aperture is midway between the fully open condition and a half open condition.
Figure 6:
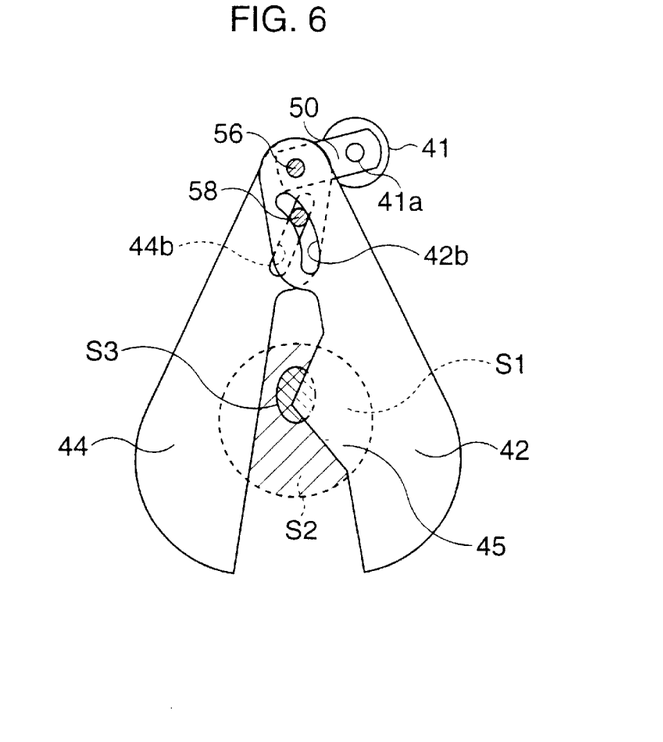
FIG. 6 is a view showing a relative positional relationship between each member of the aperture mechanism and the section of the optical path when the aperture is in the half open condition.
Figure 7:
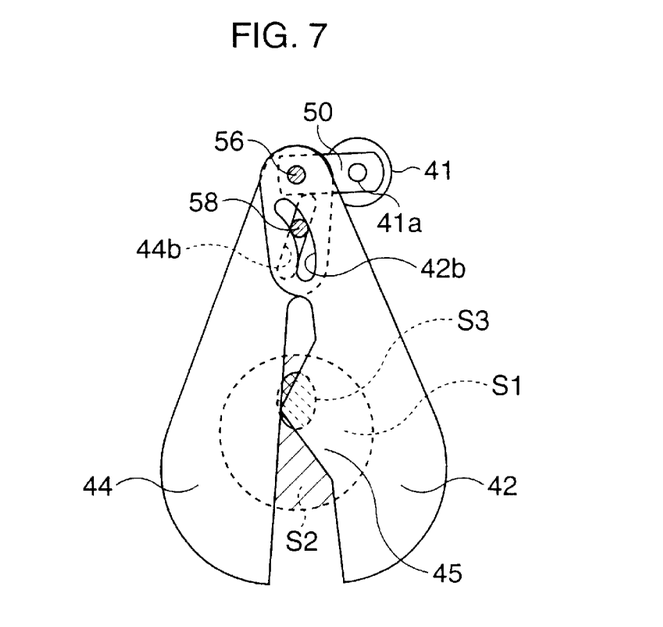
FIG. 7 is a view showing a relative positional relationship between each member of the aperture mechanism and the section of the optical path when the aperture is in a first position midway between the half open condition and a fully closed condition.
Figure 8:
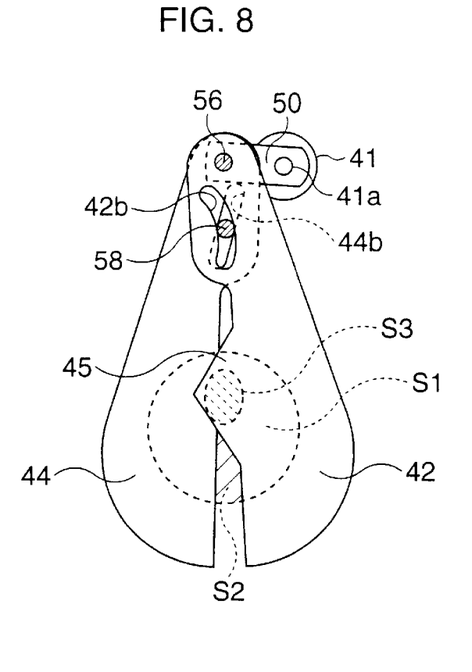
FIG. 8 is a view showing a relative positional relationship between each member of the aperture mechanism and the section of the optical path when the aperture is in a second position midway between the half open condition and a fully closed condition.
Figure 9:
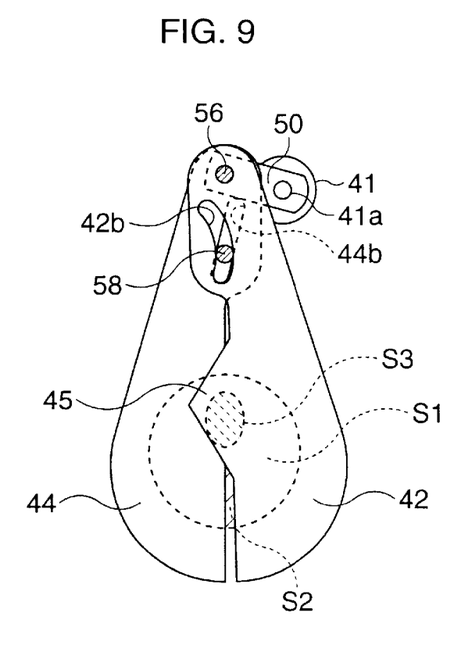
FIG. 9 is a view showing a relative positional relationship between each member of the aperture mechanism and the section of the optical path when the aperture is in the fully closed condition.

When the rotational shaft 41a of the motor 41 is rotated clockwise from the condition shown in FIG. 4, the arm member 50 is rotated clockwise about the rotational shaft 41a, the movable shaft 56 is displaced upward, so that the upper end portions of the first and second aperture blades 42 and 44 are moved upward. Thus, the first aperture blade 42 is rotated clockwise in such a manner that the guide slot 42b of the first aperture blade 42 is moved along the fixed shaft 58, and the second aperture blade 44 is rotated counterclockwise in such a manner that the guide slot 44b of the second aperture blade 44 is moved along the fixed shaft 58. Namely, the first and second aperture blades 42 and 44 are rotated toward the optical axis La about the movable shaft 56.

Thus, when the rotational shaft 41a of the motor 41 is rotated clockwise, the angle between the inside peripheries 42a and 44c becomes gradually smaller, so that the luminous flux is shaded horizontally from the outside peripheries by the first and second aperture blades 42 and 44. Namely, the degree of opening of the aperture is decreased, so that the amount of illuminating light supplied to the incident end surface 22a of the light guide 22 is reduced.

If it is assumed that an area of the light passing region S2 is 500 in the fully open condition shown in FIG. 4, the area of the light passing region S2 in each of the conditions shown in FIGS. 5, 6, 7, 8 and 9 is 440, 250, 102, 40 and 15, respectively. Note that, in FIG. 7, the light passing region S2 is divided into two regions, in which an area of the upper region is 14 and an area of the lower region is 88.

Conversely, when the rotational shaft 41a of the motor 41 is rotated counterclockwise, the degree of opening is increased and the amount of illuminating light is increased. In this opening operation, the arm member 50, and the first and second aperture blades 42 and 44, are moved in the opposite direction to the closing operation described above. A description of the opening operation is omitted.

Characteristics of the xenon lamp, which is the light source 30, are described below. The xenon lamp is suitable as an illuminating light source for an endoscope, due to the high luminance and lesser generation of heat thereof. However, since, in electric discharge, high temperature xenon gas ascends to generate a convection in the electric-discharge tube 32, the generating position of the electric discharge is unstable, and a swinging of the illuminating light occurs in an upper portion above the center of the section of the optical path. Further, in the electric discharge, an oscillation phenomenon technically known as a plasma oscillation occurs in accordance with the generation of a magnetic field, which is generated due to electric current, and this phenomenon may affect any influence on the swinging.

A region in which the swinging of the illuminating light is relatively large, i.e., a swinging region S3, is indicated by hatching from bottom-right to top-left. Note that a region cut by the protruding plate 45 is indicated by a broken line hatching. If such an illuminating light having this swinging is utilized, an image formed on the monitor device or the eyepiece will flicker and become hard to see, and this may impede or interfere with the observation.

The image flicker does not matter when the aperture is almost fully open and the amount of light is relatively large because the swinging region S3 is relatively small to the light passing region S2. However, when the aperture is closed to reduce the amount of light, since a ratio of the swinging region S3 to the light passing region S2 becomes high, the flicker becomes remarkable. Accordingly, in the embodiment, the protruding plate 45 is provided to shade the swinging region S3 when the aperture is gradually closed. Due to this construction, an illuminating light having a lesser swinging in the amount of light is obtained, and image flicker is prevented.

More precisely, the protruding plate 45 gradually shades the swinging region S3 as the aperture is closed, from a half open condition (see FIG. 6) in which the area of the light passing region S2 becomes a half of the area of the fully open condition (S2=500) shown in FIG. 4, i.e., 250. The protruding plate 45 shades approximately the whole area of the swinging region S3 in the condition shown in FIG. 7. In the condition shown in FIG. 8, in which the aperture blades 42 and 44 are further rotated, the swinging region S3 is fully closed, and in the condition shown in FIG. 9, in which the aperture blades 42 and 44 are further rotated, the light passing region S2 is approximately fully closed.

Thus, when the aperture is closed to reduce the amount of light, the luminous flux of the swinging region S3, which causes the image flicker, is shaded by the protruding plate 45. Therefore, illuminating light in which the amount of light is uniform is always supplied to the incident end surface 22a of the light guide 22, and thus an image which is easy to see is obtained.

Note that, although the protruding plate 45 is triangular in the embodiment, the size and the shape of the protruding plate 45 is not restricted. Namely, the protruding plate can be any shape which shades the swinging region S3 above the center of the luminous flux from the half open condition to the fully closed condition of the aperture. Further, although the protruding plate 45 is integrally formed on the first aperture blade 42, the protruding plate 45 may be formed on the second aperture blade 44, or may be formed on both of the first and second aperture blades 42 and 44.

As described above, according to the embodiment of the present invention, even when the degree of opening of the aperture is small, the influence of the swinging of the amount of light is reduced, so that an illuminating light in which the amount of light is uniform is obtained.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2000-162102 (filed on May 31, 2000) which is expressly incorporated herein, by reference, in its entirety.

What is claimed is:

1. A light source device for an endoscope, said light source device comprising:

a light source that radiates illuminating light to an incident end surface of a light guide of said endoscope; and an aperture mechanism that is disposed in an optical path formed between said light source and said incident end surface, said aperture mechanism having a pair of aperture blades, which are perpendicular to an optical axis of said illuminating light and rotatable about a rotation axis which is parallel to and located above the optical axis, and a protruding portion integrally formed on an inside periphery of at least one of said aperture blades, said inside periphery facing said optical path;

said aperture blades being rotated, so that said optical path is shaded horizontally from outside peripheries thereof by said aperture blades, and said aperture blades being further rotated so that an upper area above a center of said optical path is shaded by said protruding portion;

wherein said inside periphery of each of said aperture blades is linearly formed, and said protruding portion is a triangle in which a base is on said inside periphery of one of said aperture blades and a vertex is the peak of said protruding portion.

2. A light source device for an endoscope, said light source device comprising:

a light source that radiates illuminating light to an incident end surface of a light guide of said endoscope; and a shading member that is disposed in an optical path formed between said light source and said incident end surface, said shading member being movable so as to shade said optical path, said shading member having a protruding portion integrally formed on an inside periphery thereof, which faces said optical path;

said shading member being moved, so that said optical path is shaded horizontally from outside peripheries thereof by said shading member, and said shading member being further rotated so that an upper area above a center of said optical path is shaded by said protruding portion;

wherein said shading member comprises an aperture blade, and said protruding portion comprises a protruding plate flush with said aperture blade; and wherein said inside periphery is linearly formed, and said protruding plate is a triangle in which a base is on said inside periphery and a vertex is the peak of said protruding plate.

3. A device according to claim 2, wherein said light source comprises a xenon lamp.

4. A device according to claim 2, wherein said shading member is rotated about a rotation axis which is parallel to and located above an optical axis of said illuminating light.

5. A light source device for an endoscope, said light source device comprising:

means for radiating illuminating light to an incident end surface of a light guide of said endoscope;

first shading means for shading said illuminating light, said first shading means including a pair of aperture blades, said pair of aperture blades being movable so that the amount of said illuminating light, made incident on said incident end surface, is adjusted; and second shading means for shading an upper area above the center of an optical path formed between said light source and said incident end surface, said second shading means shading said upper area after said first shading means starts to shade said illuminating light, said second shading means including a protruding portion formed on an inside periphery of at least one of said aperture blades;

wherein said inside periphery of each of said aperture blades is linearly formed, and said protruding portion is a triangle in which a base is on said inside periphery of one of said aperture blades and a vertex is the peak of said protruding portion.

6. The device according to claim 1, wherein when said aperture blades are in a partially open position so that said optical path is partially shaded by said aperture blades, the upper area above the center of said optical path is shaded by said protruding portion.

7. The device according to claim 2, wherein when said shading member is in a partially open position so that said optical path is partially shaded by said shading member, the upper area above the center of said optical path is shaded by said protruding portion.

8. The device according to claim 5, wherein when said first shading means is in a partially open position so that said optical path is partially shaded by said first shading means, the upper area above the center of said optical path is shaded by said second shading means.

* * * * *